United States Patent [19]

Knuth et al.

[11] Patent Number: 5,577,104

[45] Date of Patent: Nov. 19, 1996

[54] METHOD FOR SYSTEM AND MESSAGE ACTIVATION BASED ON DISTINCTIVE RINGING

[75] Inventors: Stephen B. Knuth, Mission Viejo; Mark J. Karnowski, Garden Grove; James W. Mazzolini, Hawthorne; Sanford M. Brown, III, Torrance, all of Calif.

[73] Assignee: Casio PhoneMate, Inc., Torrance, Calif.

[21] Appl. No.: 238,984

[22] Filed: May 6, 1994

Related U.S. Application Data

[63] Continuation of Ser. No. 831,422, Feb. 5, 1992, abandoned.

[51] Int. Cl.$^6$ ................................................. H04M 3/42
[52] U.S. Cl. ................................................. 379/67; 379/201
[58] Field of Search ................................. 379/375, 373, 379/164, 165, 67, 82, 375, 374, 75, 76, 77, 31, 23, 418, 252, 253, 73; 340/825.15, 825.06

[56] References Cited

U.S. PATENT DOCUMENTS

| | | | |
|---|---|---|---|
| 3,193,620 | 7/1965 | Marheine | 179/6 |
| 3,679,831 | 7/1972 | Bonsky | 179/2 |
| 4,591,664 | 5/1986 | Freeman | 379/375 |
| 4,626,631 | 12/1986 | Hanscom | 379/165 |
| 4,646,347 | 2/1987 | Liu | 379/375 |
| 4,679,229 | 7/1987 | Yamaguchi | 379/373 |
| 4,782,518 | 11/1988 | Mattley | 379/201 |
| 4,847,889 | 7/1989 | Eswaran | 379/67 |
| 4,866,755 | 9/1989 | Hashimoto | 379/76 |
| 4,926,470 | 5/1990 | Sanford | 379/199 |
| 4,959,853 | 9/1990 | Del Monte | 379/180 |
| 4,985,913 | 1/1991 | Shalom | 379/76 |
| 4,998,273 | 3/1991 | Nichols | 379/102 |
| 5,040,209 | 8/1991 | Greenberg | 379/373 |
| 5,121,422 | 6/1992 | Kudo | 379/67 |

OTHER PUBLICATIONS

Owner's Manual TAD-252 by DuoFone, Cat. No. 43-395.
Advertising: Fone Filter by South Tech Instruments.

*Primary Examiner*—Jeffery Hofsass
*Assistant Examiner*—Thomas F. Presson
*Attorney, Agent, or Firm*—Frishauf, Holtz, Goodman, Langer & Chick

[57] ABSTRACT

A telephone answering device (TAD) determines the "distinctiveness" of an incoming ring signal, and responds accordingly. Distinctive ring features of some current telephone utilities have established ring patterns with plural ring signals occurring within a single ring cycle. Normally, one ring signal is present per ring cycle. In the distinctive ring TAD set forth herein, ring cycles with one or more ring signals are discriminated and responded to by playing a different outgoing message corresponding to the distinctiveness of the ring cycle. In a further enhancement, the TAD does not answer the incoming telephone call if the answer ring cycle (upon which the TAD is to answer the call) is cut short, indicating that the telephone call has been answered by a person.

9 Claims, 4 Drawing Sheets

METHOD FOR SYSTEM AND MESSAGE ACTIVATION BASED ON DISTINCTIVE RINGING

This application is a continuation of application Ser. No. 07/831,422, filed Feb. 5, 1992 now abandoned.

BACKGROUND

1. Field of the Invention

This invention relates to telephone answering devices (TADs) and particularly to TADs that answer a telephone line accessible by more than one telephone number.

2. Description of the Related Art

Telephone answering devices are now commonplace in today's society. With most TADs, incoming telephone calls are answered, are delivered a pre-recorded outgoing message, and the caller is given opportunity to record his or her message for later playback by the TAD's user. When the TAD is connected to a telephone line which is accessed by only a single telephone number, there is often no reason to have more than one outgoing message delivered to callers. In such a situation, the outgoing message may be delivered in whatever context the user chooses.

Recent advances in the art allow the individual user more flexibility in telephone service. New advances in telephone service include: automatic dialing through the telephone exchange (speed calling), allowing a second incoming caller to notify the called party that a second call is coming in (call waiting), and the ability to transfer an incoming call to another number when the user is away (call transfer).

One further development is the ability for two telephone numbers to share the same incoming telephone line. One reason for this feature is the increasing use of the home as a professional workplace. The user may have two telephone numbers, one for personal calls and the other for business, that both ring the same physical telephone in the user's home. As a person may want to know when the incoming call is to the business number and when the call is to the personal line, one useful way to distinguish the incoming calls is by having the telephone ring differently depending upon which number is being called. This feature has been termed "distinctive ring".

As an example, one way for the telephone to ring differently is to have different cadences of telephone ring sequences depending upon which number is being called by the caller. The personal line could ring normally while the business line could ring twice as fast, twice as slow, or with another different and readily identifiable ring sequence. The use of distinctive ring sequences that depend on the number being called prepares the called person for the type of call being placed.

Distinctive ring patterns are typically generated by intermittently ringing the telephone for a certain period of time, then maintaining a gap of silence for another certain period of time. For one example of a distinctive ring pattern, the telephone may give off three short ring signals, remain silent for a second or two, then repeat the pattern until the telephone is answered or the caller hangs up.

As people do not stand sentry over their telephones waiting for them to ring, the telephone may be left unattended for long periods of time. TADs have previously provided means by which telephone messages could be received when the incoming call would otherwise go unanswered. Previously, two separate TADs were required for two separate telephone lines, one TAD for each number. The earlier related art did not address the problem of answering the telephone and recording messages from it when two telephone numbers accessed the same telephone. Earlier art treated both types of calls the same by playing the same outgoing telephone message to the caller whether or not the caller called the business telephone number or the personal telephone number.

The mechanism for identifying the distinctive rings and routing the incoming calls to systems is known in the art. For example, a device called the Fone Filter, manufactured by South Tech Instruments of Hollywood, Fla. assigns a different ring pattern to each connected device and automatically routes the calls to the appropriate device, based on the corresponding ring pattern that is received.

Another unsolved problem with answering machines is that whenever a user picks up the handset during the answer ring cycle, that is the ring cycle upon which the telephone answering device (TAD) automatically answers the telephone line, the TAD automatically plays the outgoing message even though the answering machine was set up to answer only if no one answered the telephone. This occurs because as soon as the handset is picked up, the ring cycle is interrupted and the answering machine wrongly assumes that the ring cycle has ended naturally without anyone picking up and answering the telephone. In other words, picking up the handset automatically triggers the Out Going Message (OGM) though clearly that is not what is desired or best. No known solution exists in the art, although a partial solution is present.

In order to partially solve this problem, the OGM can be set up to stop playing if the handset is picked up during the OGM or message recording. This mechanism is commonly referred to as Auto Disconnect which senses the drop in line voltage caused by the handset going off hook.

Although well known in the art, the Auto Disconnect mechanism does not suppress the OGM when the user picks up a parallel telephone or extension during the answer ring cycle. When the user picks up during the answer ring cycle, the voltage drop occurs before the answering machine is on the line and the Auto Disconnect circuit is unable to detect the telephone going off hook. The TAD continues to proceed by playing the OGM and recording a message.

An information disclosure statement has been submitted regarding this patent. The following list contains previous patents potentially related to the present invention:

U.S. Pat. No. 3,193,620 issued to Marheine on Jul. 6, 1965;
U.S. Pat. No. 3,679,831 issued to Bonsky on Jul. 25, 1972;
U.S. Pat. No. 4,626,631 issued to Hanscom on Dec. 2, 1986;
U.S. Pat. No. 4,646,347 issued to Liu on Feb. 24, 1987;
U.S. Pat. No. 4,782,518 issued to Mattley et al. on Nov. 1, 1988;
U.S. Pat. No. 4,926,470 issued to Sanford on May 15, 1990; and
U.S. Pat. No. 4,985,913 issued to Shalom et al. on Jan. 15, 1991.

Other references include:
U.S. Pat. No. 3,555,189 issued to Quatse on Jan. 12, 1971;
U.S. Pat. No. 4,066,848 issued to Darwood on Jan. 3, 1978;
U.S. Pat. No. 4,117,272 issued to Ando on Sep. 26, 1978;
U.S. Pat. No. 4,356,355 issued to Ferrieu et al. on Oct. 26, 1982;
U.S. Pat. No. 4,390,843 issued to Betts et al. on Jun. 28, 1983;
U.S. Pat. No. 4,484,036 issued to Lyle et al. on Nov. 20, 1984;

U.S. Pat. No. 4,731,828 issued to Basehore on Mar. 15, 1988;

U.S. Pat. No. 4,939,775 issued to Houck et al. on Jul. 3, 1990;

U.S. Pat. No. 4,975,940 issued to Hashimoto on Dec. 4, 1990;

Japanese Patent No. 57-131159 issued to Sakamoto on Aug. 13, 1982;

Japanese Patent No. 2-65351 invented by Takenaka and issued to Sharp Corp. on Mar. 6, 1990;

Soviet Patent/Certificate of Invention No. 760479, application no. 2312145/18-09, filed on Jan. 12, 1976.

SUMMARY OF THE INVENTION

The present invention resides in a method for a telephone answering device (TAD) for distinguishing between at least two different ring sequences on a single telephone line and playing a pre-recorded message corresponding to the different ring sequence received by the TAD. In this way, the distinctive ring feature of present telephone utilities can be used by a TAD to address the incoming call with an appropriate outgoing message directed to the number for which the call is incoming.

A ring cycle is a periodic sequence of ring signals that indicate a call on the telephone line. The ring cycle is defined by a period of ringing, usually intermittent, followed by a period of silence. The ring cycles continue until the phone is answered or the caller hangs up.

A ring cycle is determined for the purposes of the telephone answering device (TAD) within which a certain number of ring signals are counted. When a valid ring cycle has been determined, the number of ring signals present within the ring cycle is established. That certain number of ring signals counted within the ring cycle determines which type of distinctive ring is being received by the TAD. Once determined, the number of ring signals in the ring cycle is stored for later use.

The TAD answers the incoming call after a predetermined number of ring cycles have been detected. The ring detection information is used by the method to determine when and how the incoming call should be answered. Upon receiving the appropriate number of ring cycles, the TAD answers the telephone, plays the appropriate outgoing message, and records the caller's message.

In addition to the determination of the distinctiveness of the ring cycle, the TAD of the present invention also prevents the TAD from answering the incoming telephone call on the ring cycle the TAD would normally answer the incoming telephone call. In other words, when a person answers the phone during the ring cycle upon which the TAD answers the telephone, the TAD suppresses the outgoing message and does not interfere with the telephone call.

OBJECTS OF THE INVENTION

It is an object of the present invention to provide a telephone answering device (TAD) capable of answering a single telephone line corresponding to a plurality of telephone numbers.

It is another object of the present invention to provide a TAD capable of distinguishing between different ring cycles that correspond to different telephone numbers connected to the same telephone.

It is another object of the present invention to provide a TAD capable of playing a plurality of outgoing messages, each outgoing message corresponding to different ring cycles that may become present on a single telephone line.

It is yet another object of the present invention to prevent a TAD from answering the telephone when the telephone has already been answered.

These and other objects and advantages of the present invention will be apparent from a review of the following specification and accompanying drawings.

DESCRIPTION OF THE PREFERRED EMBODIMENTS

Unless otherwise specified, a "TAD" is a distinctive ring telephone answering device (distinctive ring TAD).

Figure 1:
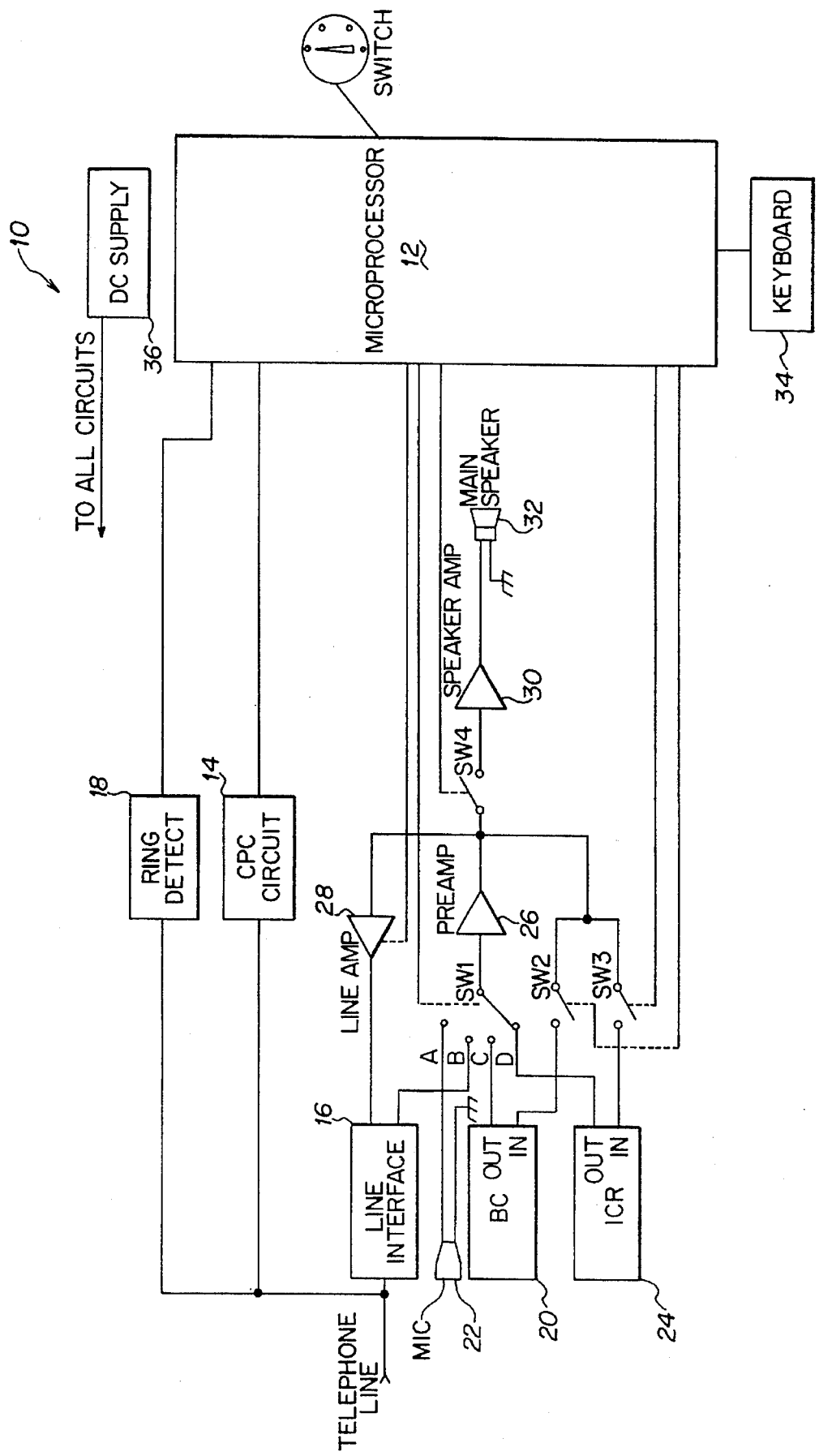
FIG. 1 shows a schematic representation of the distinctive ring telephone answering device (TAD).

Referring to FIG. 1, the block diagram of a typical TAD 10 is shown. The components and operation of a typical TAD are well known in the art and will not be described in detail. However, a brief description of each block follows:

a Microprocessor 12 provides general control of the TAD 10 and includes memory storage for the pre-programmed software portions of all routines and instructions needed for proper TAD functioning;

a CPC Circuit 14 detects an interruption or break in the loop current when the caller hangs up, and provides a signal (logic level) to the microprocessor 10 upon detecting it;

a Line Interface 16 couples the audio signal from the telephone line to the audio circuitry of the telephone answering machine and vice-versa;

a Ring Detect Circuit 18 (shown in detail in FIG. 2) detects the ring signal on the telephone line, and provides a signal (logic level) to the microprocessor 12 upon detecting it;

an Outgoing Message block 20 delivers an outgoing message from a selection of available outgoing messages (prerecorded through microphone 22);

an Incoming Message block 24 records the caller's message through its input terminal and plays back the message through its output terminal;

switches SW1–SW4, which are controlled by the microprocessor 12 provide conduction paths for the audio signals that correspond to the operative state of the telephone answering machine 10;

a Preamp 26 amplifies the tape or line audio signal in preparation for playback or record;

a Line Amp 28, enabled by the microprocessor 12, sends the output signal of the Preamp 26 to the telephone line;

a Speaker Amp 30 amplifies the audio signal so that it can be played back through the main speaker 32;

a Keyboard 34, connected to the microprocessor, allows the user to manually operate the unit; and a DC Power Supply 36 provides electrical power to the above-mentioned circuitry.

Although there can be variations in the implementation of the TAD, the basic operation remains the same. FIG. 1 shows typical TAD circuitry.

Figure 2:
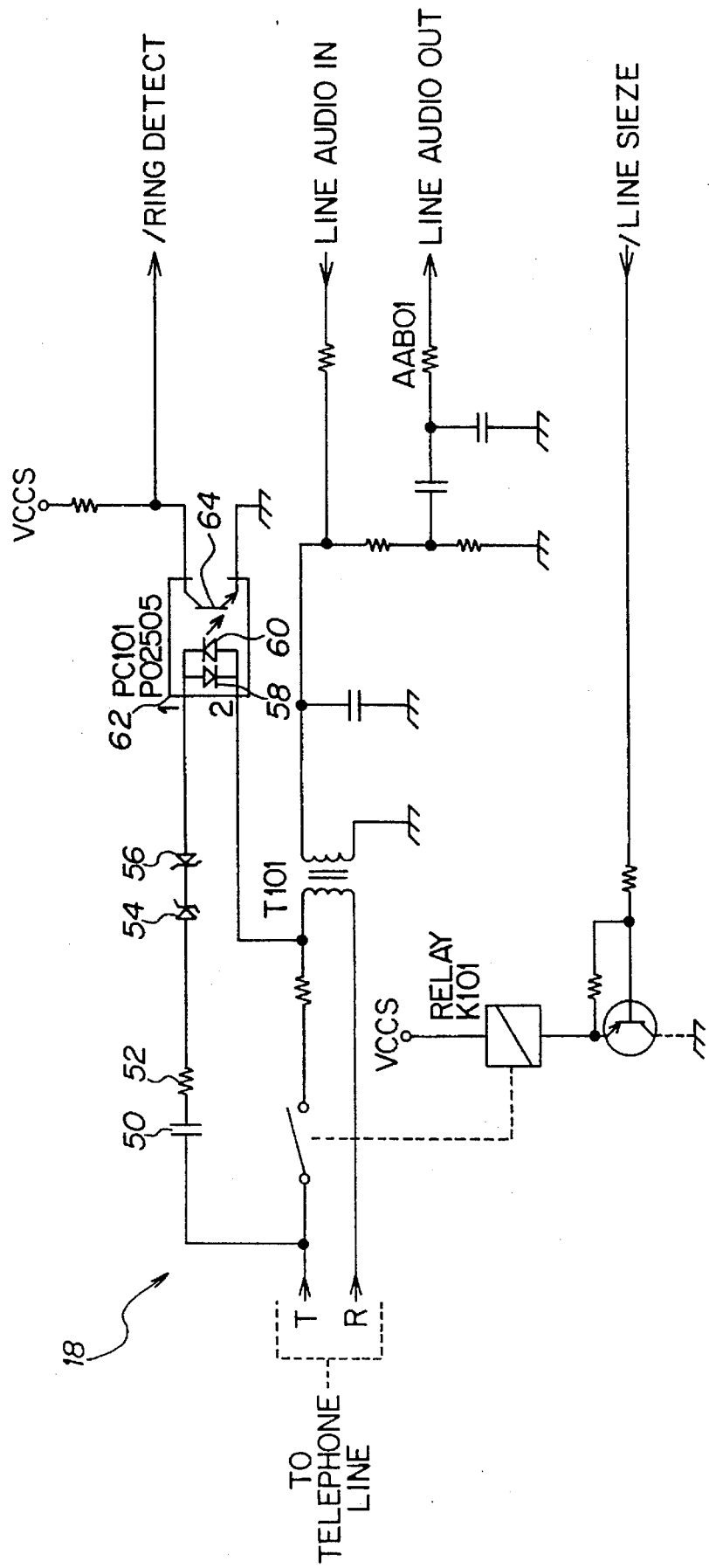
FIG. 2 shows a schematic representation of the ring detection interface of the distinctive ring TAD.

FIG. 2 shows a typical ring detect circuit 18. Combined with a microprocessor, the ring detect circuit 18 can detect signals from sixteen to sixty-eight Hertz and as low as thirty-five volts rms.

The incoming ring signal is transmitted to capacitor 50. Capacitor 50 blocks any DC offset that the ring signal might have. The ring signal is then passed through resistor 52, which limits the current of the ring signal. Beyond resistor 52, the ring signal encounters two zener diodes 54, 56 in a back-to-back configuration. These diodes typically have a zener voltage of approximately thirty volts and block any extraneous low voltage signals from passing beyond them. These extraneous low voltage signals could be misinterpreted as incoming ring signals. Blocking these signals prevents such misinterpretation.

For signals passing through the zener diode pair 54, 56, one of the light emitting diodes (LEDs) 58, 60 of the bidirectional optoisolater 62 will conduct in response to the signal. The conducting LED causes the opto 64 to turn on and conduct. In this way, the microprocessor 12 will have its ring detect input impressed with a low-going pulse for each positive and negative peak of the incoming ring signal.

As the microprocessor 12 periodically samples the ring detect input, the pulses impressed upon the ring detect input can be measured by the microprocessor 12. Measurement of the pulses allows the microprocessor to distinguish between, say, ring signals which have frequencies greater than sixteen Hertz and pulse dial signals which have frequencies of approximately ten Hertz.

Figure 3:
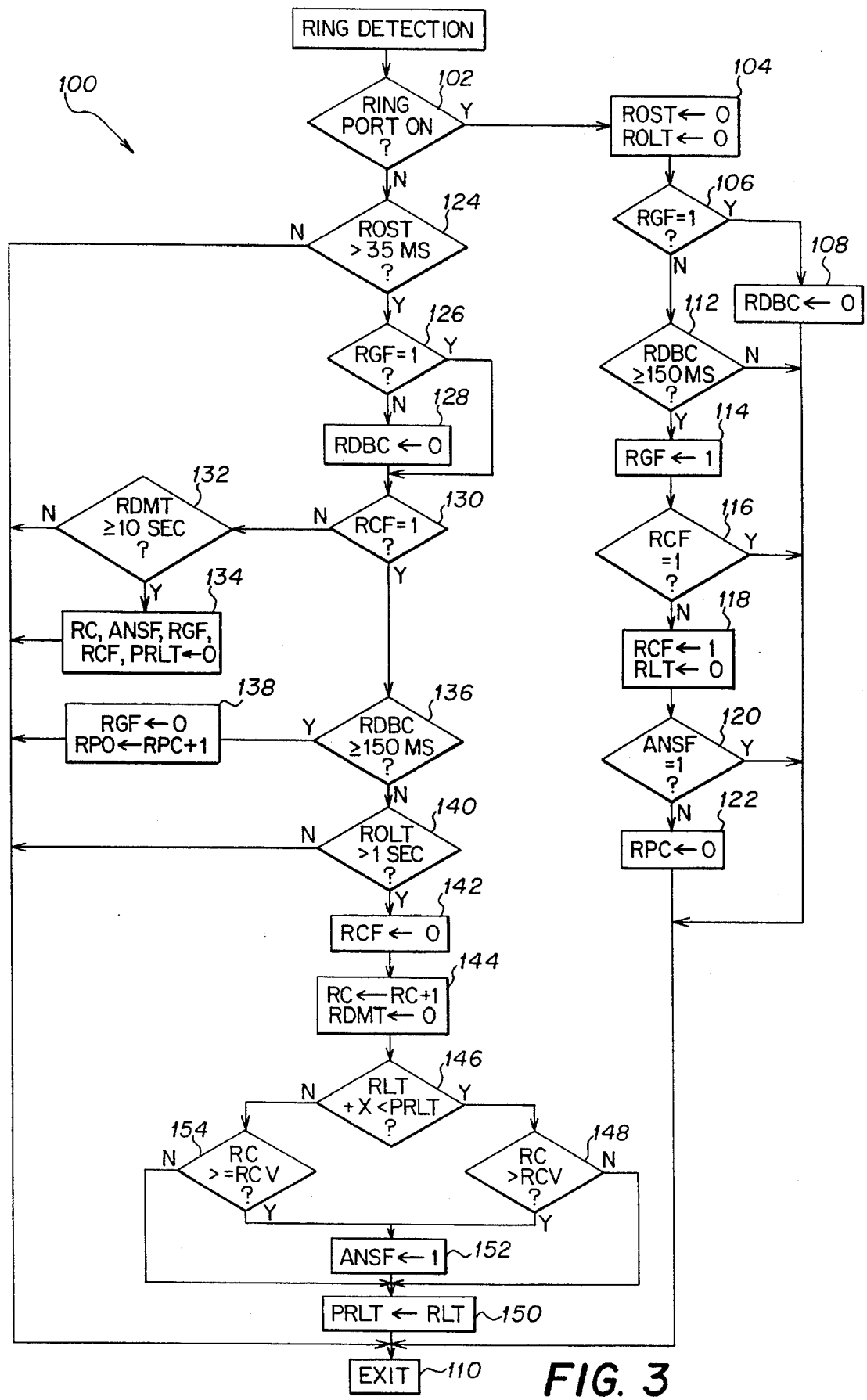
FIG. 3 shows steps related to the determination of the ring cycle and the distinctiveness of the incoming ring via a Ring Detection Routine.
Figure 4:
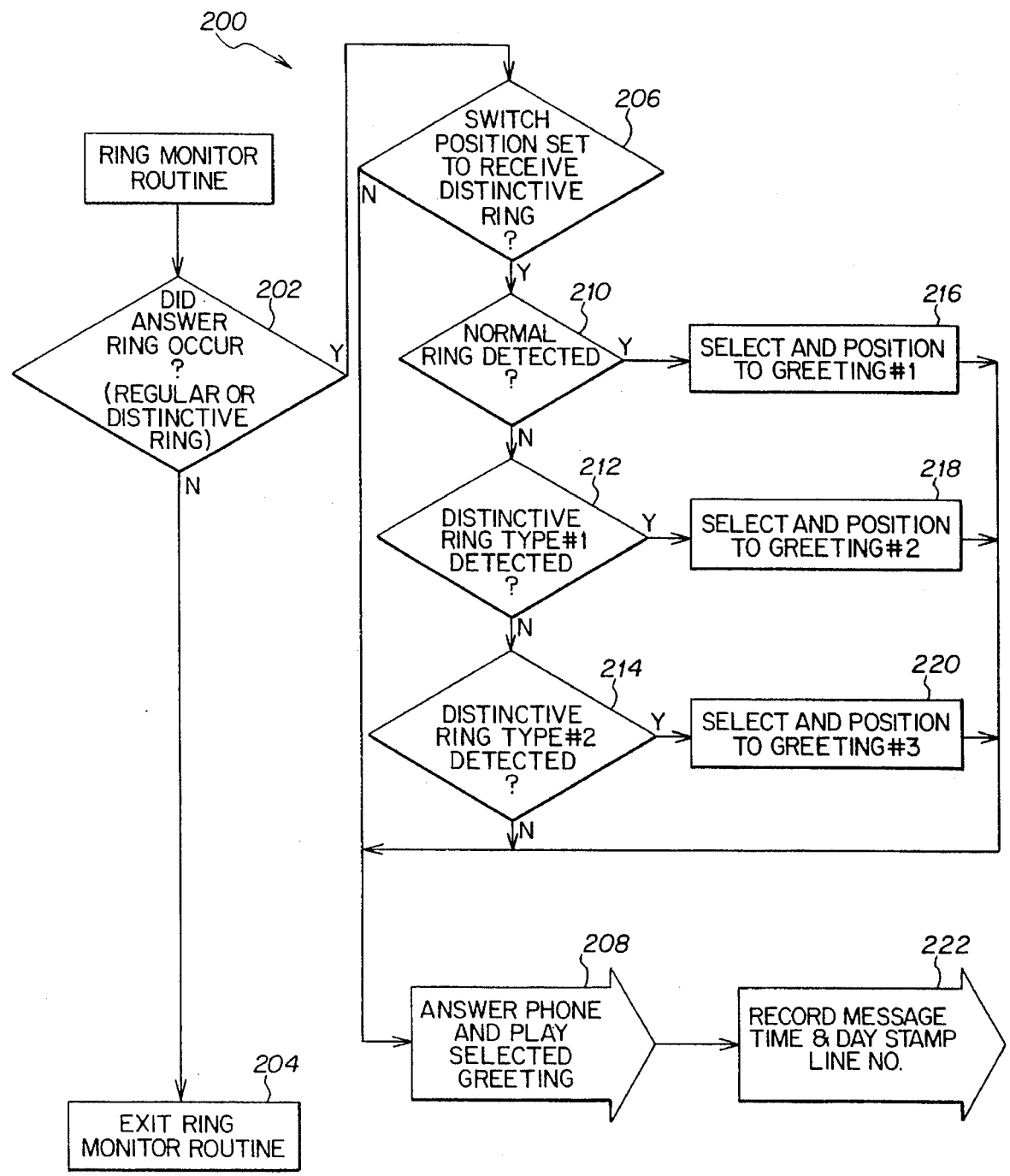
FIG. 4 shows steps related to the determination of which outgoing message to play upon the activation of the TAD through a Ring Monitor Routine.

FIG. 3 portrays schematically the Ring Detection Routine used by the microprocessor 12. At the core of the distinctive ring TAD 10 is the ring detection routine 100. The ring detection routine 100 determines the "distinctiveness" of the ring cycle as well as the number of ring cycles that have occurred. The ring detection routine also determines if the final ring has been cut short. The ring detection routine is performed once approximately every few milliseconds while the TAD is idle in order to detect incoming ring signals.

A "ring cycle" is defined as that period in which the distinctive ring occurs. "Ring signal" is defined as any incoming signal recognized as a ring. Several "ring signals" can occur during one "ring cycle".

Initially, the TAD is idle, ready to receive incoming phone calls. If a handset is present, it rests in its cradle placing the TAD onhook. The TAD is not receiving any incoming messages.

The ring port through which the currently idle TAD is connected to the Ring Detect Circuit of FIG. 2, and is checked by the microprocessor 12 for any activity 102. Activity on the ring port usually indicates that a ringing signal is being sent through the telephone line to the TAD, signalling an incoming telephone call.

I. Ring Port On

If the ring port is on, the ring detection routine implements a series of steps to determine how the present signal fits within the ring cycle.

When activity is detected on the ring port, the ROST (Ring Off Short Timer) and the ROLT (Ring Off Long Timer) memory registers are both set to zero 104.

The ROST is primarily used for dial tap and spurious signal detection and filtration. A dial tap is a short pulse that is generated on the line when a pulse dialing telephone is dialed. The dial tap could possibly be misinterpreted by the TAD as a ring signal. The ROST register measures the duration of silence (or off time) between pulses of the incoming signal through the ring port. The ROST acts as a timer, and has a sufficiently fine resolution to filter out dial taps and other spurious impulses and signals.

For example, if the ROST is incremented every 2.28 milliseconds, a one nibble counter (four bits) allows the ROST to measure intervals of approximately thirty-five milliseconds with each increment. In the preferred embodiment, once the ROST register reaches its maximum value, no further incrementation of the ROST takes place. In the example, the one nibble ROST register would maintain a value of 1111 once the ROST reached that maximum value.

The ROLT (Ring Off Long Timer) register is used to measure an interval of one second after the end of the last ring signal. The one second interval occurring after the last ring signal is significant and explained below. As a one second interval is a fairly substantial amount of time in comparison to the operation of the electronics in the TAD, the time resolution of the ROLT can be low. For example, if the ROLT is one nibble (four bits) wide and incremented every seventy milliseconds, a time interval of approximately one second is clocked by the ROLT.

These registers are incremented outside of the ring detection routine on an ongoing basis so that the values of the ROST and ROLT registers reflect the elapsed time since they were reset to zero.

Once the ROST and ROLT timers have been reset to zero 104, the RGF (Ring Generation Flag) is tested 106. The RGF indicates the presence of a valid incoming ring signal and is explained in more detail below.

If the RGF is set, or equal to one, the RDBC (Ring DeBounCe) register is set to zero 108 as a valid ring has been detected and a ring cycle is currently ongoing. Exit is then made from the ring detection routine 110.

The RDBC register is used to debounce the leading and trailing edge of the ring signal. Validation of a ring signal includes debouncing the signal so that spurious signals on the incoming line to the ring port are not considered to be valid ring signals. Debouncing the ring signal includes delaying any response by the TAD to that ring signal until the signal has consistently been detected for at least one hundred fifty milliseconds. One hundred fifty milliseconds is considered a sufficient time interval in order for the ring signal to debounce. In order for a one nibble RDBC register to measure an interval of one hundred and fifty milliseconds, the RDBC should be incremented once approximately every ten milliseconds.

If the RGF is not equal to one 106, a number of further other steps are performed before exit is made from the ring detection routine. If the RGF is not set or not equal to one upon testing, the RDBC register is tested to see if one hundred fifty milliseconds have yet passed since the RDBC was last reset 112. If one hundred fifty milliseconds have not passed, exit is made from the ring detection routine 110 as the ongoing ring signal has not yet been validated by debouncing.

If the RDBC reflects the passing of a time interval greater than one hundred fifty milliseconds 112, the RGF (Ring Generation Flag) is set to one 114 as a valid, debounced ring signal has been detected. The RGF is set when an incoming ring signal has been detected and validated. It can be seen then that the RGF flag is set after one hundred fifty milliseconds of continuous ring signal detection. This time interval of one hundred fifty milliseconds is the same as the maximum time interval of the RDBC register.

After the RGF flag is set 114, it may be tested and steps requiring the presence of a valid ring signal can then be properly performed. One such step requiring the presence of a valid ring signal is the ringing of a telephone handset unit connected to the distinctive ring TAD. As will be seen below, ringing of the telephone handset may continue until the RGF is cleared (set to zero). The audible ring of the ringing telephone handset follows the RGF, and both lag behind the actual incoming ring signal by one hundred fifty milliseconds so that the incoming ring signal can be validated/debounced.

After the RGF is set, the RCF (Ring Cycle Flag) is tested 116. The RCF is set for the duration of the ring cycle no matter how many ring signals may be present in a single ring cycle. The end of a ring cycle occurs when no ring signal is detected for a time interval of at least one second. For distinctive rings, several ring signals may be present within a single ring cycle. For distinctive ringing, each individual ring signal within a ring cycle is within a one second time interval of the next or preceding ring signal.

If the RCF is set (or equal to one) 116, an ongoing ring cycle is present, and exit is made from the ring detection routine 110.

If the RCF is not set (or equal to zero) 116, a ring cycle has Just begun, the RCF is set and the RLT (Ring Length Timer) register is cleared or reset to zero 118.

The RLT is a register similar to the ROST, ROLT, and RDBC. The RLT is used to measure the length of the entire ring cycle. Preferably, the time interval measured by the RLT is approximately five seconds. If the RLT uses a nibble (four bits) of memory, then the RLT is incremented once approximately every three hundred milliseconds.

After the RCF and RLT are respectively set and cleared, the ANSF (Answer Flag) is tested 120. The ANSF is set when the RC (Ring Counter, below) is greater than or equal to the RCV (Ring Counter Value, below). The ANSF is cleared when the telephone line is answered (goes offhook) or when the ten second RDMT (Ring Dead Man Timer, below) has expired. The ANSF indicates when the TAD should answer an incoming telephone call. If the ANSF is set, the number of ring cycles for answering has passed and the TAD should answer the call. The number of ring cycles occurring for the TAD to answer an incoming call is usually selected by the user of the TAD. Typically there are several choices for that number of occurring ring cycles available to the user.

If the ANSF is set or equal to one 120, exit is made from the ring detection routine 110. If the ANSF is cleared or not equal to one 120, the RPC (Ring Per Cycle) register is cleared or set to zero 122. The RPC counts the number of ring signals that are present in each ring cycle. For a normal ring, the RPC will ultimately have a value of one as there is one ring signal per ring cycle in normal rings. For distinctive rings, the RPC will ultimately have a value of more than one as distinctive rings have a plural number of ring signals per ring cycle. Currently, the RPC need only be two bits wide in order to encompass the number of distinctive ring types available from most telephone utilities.

Exit is then made from the ring detection routine 110.

II. Ring Port Off

Having set forth the steps undertaken when a signal is present at the ring signal port, the steps undertaken when a signal is not present at the ring signal port are now set forth, below.

If no signal is detected at the ring signal port when the ring signal port is checked for a signal 102, the ROST (Ring Off Short Timer) register is tested for an elapsed time greater than thirty-five milliseconds 124. If the ROST has not registered an elapsed time of thirty-five milliseconds from the start of its incrementation 124, an insufficient period of time has passed for further evaluation of any incoming ring signal. Exit is made from the ring detection routine 110 so that more time may elapse before evaluating the incoming ring signals.

If the ROST has registered an elapsed time of greater than thirty-five milliseconds 124, further evaluation of an incoming ring signal can take place. The RGF (Ring Generation Flag) is tested for its state or value 126. The value of the RGF indicates whether or not the ring port is receiving an incoming telephone ring signal.

If the RGF is clear or not equal to one 126, no incoming ring signal is being received over the ring port, and the RDBC (Ring DeBounCe) register is reset to zero 128. If the RGF is set or equal to one, an incoming ring signal is being received, and the RDBC is not reset.

The RCF (Ring Cycle Flag) is then tested for its value 130. If the RCF is clear, no ring cycle is currently ongoing and the RDMT (Ring Dead Man Timer) register is tested to see whether it has accumulated an elapsed time of greater than or equal to ten seconds 132. If ten seconds or more has passed without a ring signal occurring, it is assumed that the telephone has either been answered by the user, or the caller has hung up before the TAD has answered.

If the RDMT register does not reflect the passing of ten seconds 132, exit is made from the ring detection routine 110. If the RDMT reflects the passing of ten seconds or more 132, a number of flags and registers are initialized. The RC (Ring Counter) register is reset to zero, as are the ANSF (Answer Flag), the RGF (Ring Generation Flag), the RCF (Ring Cycle Flag), and the PRLT (Previous Ring Length Timer) 134.

If the RCF is set or equal to one 130, the RDBC is tested for the passing of at least one hundred fifty milliseconds 136. If the RDBC reflects the passage of at least one hundred fifty milliseconds 136, the RGF is cleared thereby validating the end of the ring signal and the RPC (Ring Per Cycle) register is incremented by one as another valid ring signal has been detected 138. Exit is then made from the Ring Detection Routine 110.

When the RGF is cleared, certain actions or steps can be performed in response thereto. One such action is the cessation of audible ring signals made by a telephone connected to the TAD.

If the RDBC reflects a time interval of less than one hundred fifty milliseconds 136, the ROLT (Ring Off Long Timer) is tested for the passage of one second since the ROLT was first incremented 140. If the ROLT does not reflect the passage of more than one second 140, exit is made from the ring detection routine 110 as a ring cycle is or may still be ongoing. If the ROLT does reflect the passage of more than one second 140, the RCF is cleared as the end of a ring cycle has been detected 142.

The RC (Ring Counter) is incremented as another valid ring cycle has occurred 144. The RDMT is set to zero 144 so that the ten second "dead man" interval can begin as a ring cycle has ended and, as each ring cycle could be the last, the "dead man" interval must be clocked after every ring cycle.

The value of the RLT (Ring Length Timer) register plus a value signifying allowable error, "X", is compared to the value of the PRLT (Previous Ring Length Timer) register 146. The RLT reflects the length of ring cycle just ended while the PRLT reflects the length of the ring cycle just previous to that.

If RLT plus X is less than the PRLT 146, then the ring cycle just ending is shorter than the one just prior to that. From this, either the handset has been picked up, the caller has hung up, or a short ring has been inadvertently sent by the telephone utility company. Either way, the TAD should not answer the telephone line as the call has, respectively, already been answered, is no longer present, or is an inadvertent short ring generated by the telephone utility.

When RLT plus X is less than the PRLT 146, a short ring cycle has occurred. The RC is then compared to the RCV 148 and if the RC is less than or equal to the RCV, the telephone call is not yet ready to be answered by the TAD. The value of the RLT register is copied into the PRLT register 150 and exit is made from the ring detection routine 110.

If the RC is greater than the RCV 148, the ANSF is set to one 152, indicating that the incoming call should be answered. The value of the RLT register is copied into the PRLT register 150 and exit is made from the ring detection routine 110.

If RLT plus X is not less than PRLT 146, no such short ring cycle has occurred, and no interruption of the ringing sequence has occurred. In such a case, the RC (Ring Counter) register is compared to the RCV (Ring Counter Value) register 154. If the RC is less than the RCV 154, the incoming call is not yet ready to be answered by the TAD. The value of the RLT register is copied into the PRLT register 150 and exit is made from the ring detection routine 110.

If the RC is greater than or equal to the RCV 154, the ANSF is set to one 152, indicating that the incoming call should be answered. The value of the RLT register is copied into the PRLT register 150 and exit is made from the ring detection routine 110.

From the foregoing, and FIG. 3, it can be seen that the detection of a short ring 146 usually requires a ring count (RC) greater than the ring counter value (RCV) for the TAD to answer the call. When no short ring has occurred 146, if the RC is equal to or greater than the RCV 154, the TAD will begin to answer the call. If a short ring has occurred 146, the RC must be greater than the RCV for the TAD to begin the answering process.

This method is used so that an inadvertent short ring transmitted by the telephone utility on the answer ring cycle does not cause the TAD to neglect answering the call. Instead, if a short ring cycle has occurred 146 when the TAD would normally answer the call, the TAD will answer on the next ring cycle of any duration as the RC must be greater than the RCV. While a short ring cycle on the end or answer ring usually indicates that the telephone has been answered, if the telephone line should continue to ring subsequent to the short ring cycle, the TAD adjusts for the erroneous and inadvertent short ring cycle and answers the call.

If answering the telephone generates a true short ring cycle, the TAD pauses for a following confirming ring cycle before answering the call. Otherwise, the answered telephone interrupts and prevents further ringing and the TAD resets when no further ring cycles subsequently occur.

III. Outgoing Message Selection

Once the TAD 10 has answered the incoming telephone ring cycle, certain registers are maintained at their current level. Of these registers, the most important is the RPC (Ring Per Cycle) register. The RPC register can be accessed outside of the Ring Detection Routine and when so done, indicates the type of ring cycle that was present on the incoming telephone line.

A Ring Monitor Routine 200 is used to determine the outgoing message to be played in response to the incoming ring cycle. The Ring Monitor Routine 200 may be performed after each time the Ring Detection Routine 100 has been performed. In this way, the information gathered via the Ring Detection Routine 100 can be used to prepare the TAD to answer the incoming call appropriately.

As the incoming telephone ring cycle may or may not be distinctive, the TAD user may or may not care to have different outgoing messages played according to the distinctiveness of the incoming ring cycle. As is known in the art, a switch may be employed allowing the user to determine whether or not the TAD answers incoming telephone calls according to the incoming ring cycle of that call.

Upon entrance to the Ring Monitor Routine 200, if the TAD has not answered an incoming telephone call 202, exit is made from the Ring Monitor Routine 204.

If the switch is set to ignore distinctive ring cycles 206, the evaluation of the distinctive ring cycle is bypassed and the selected generic message is played for any type of incoming ring cycle, distinctive or not 208.

If the switch is set to allow evaluation of incoming telephone ring cycles 206, the RPC (Rings Per Cycle) register is evaluated 210, 212, 214. If the RPC register reflects that one ring signal occurred per ring cycle 210, then a first outgoing message is selected and the TAD is prepared for playback of that first outgoing message 216.

Similarly, if the RPC register reflects that two ring signals occurred per ring cycle 212, then a second outgoing message is selected and the TAD is prepared for playback of that second outgoing message 218.

The same is true for third 214, and further (not shown), ring signals per cycle as reflected by the RPC register. Upon indication of a certain number of ring signals per ring cycle, say three, a corresponding outgoing message is selected and the TAD prepares itself for playback of that corresponding message 220.

Once the TAD answers the call, the appropriate outgoing message is played to the caller 208, and the caller's incoming message may be recorded for future playback to the TAD user 222. As is known in the art, a timestamp may be attached to the caller's incoming message so that the TAD user may know when and from which telephone number the caller recorded the incoming message 222.

Upon completing the tasks related to answering the incoming call, the TAD resets and awaits other incoming calls. Such other incoming calls are also answered by a process implemented as described above.

In alternative embodiments of the present invention, the TAD may respond to incoming calls in several selectable ways with different responses chosen for each accessing number and/or distinctive ring cycle. The TAD may announce an outgoing message for one or several distinctive ring cycles, with the same or different outgoing messages played back for the same or different accessing telephone numbers. Similarly, the TAD may make no response for calls incoming on one or several of the accessing telephone numbers. Also, the TAD may record incoming messages for some, but not all, accessing numbers.

While the present invention has been described with regards to particular embodiments, it is recognized that additional variations of the present invention may be devised without departing from the inventive concept.

What is claimed is:

1. A single telephone answering device for use with a single telephone line, comprising:

means in said single telephone answering device for recording a plurality of outgoing messages, each outgoing message being associated with a particular different type of ring received on the single telephone line;

a single ring type identification means in said single telephone answering device, coupled to the single telephone line, for identifying a ring type received on said single telephone line; and a playback unit in said single telephone answering device, coupled to said ring type identification means and to said single telephone line, and being responsive to said ring type identification means for automatically playing back on said single telephone line a selected one of said plurality of recorded outgoing messages which corresponds to said received ring type identified by said ring type identification means; and an incoming message recording/playback unit in said single telephone answering device for recording all incoming messages associated with all ring types identified by said ring type identification means and which are received on said single telephone line, and said incoming message recording/playback unit being responsive to a single interrogation for playing back all recorded incoming messages received on said single telephone line regardless of the ring type associated with the respective recorded incoming messages and regardless of which outgoing message a caller listened to.

2. The telephone answering device of claim 1, further comprising means responsive to said ring type identification means for causing said single telephone answering device not to respond to incoming telephone calls in response to at least one identified ring type.

3. The telephone answering device of claim 1, further comprising means responsive to said ring type identification means for causing said single telephone answering device to only play back an outgoing message without further action in response to at least one identified ring type.

4. The telephone answering device of claim 1, further comprising means responsive to said ring type identification means for causing said single telephone answering device not to play back an outgoing message and to only record an incoming message in response to at least one identified ring type.

5. The telephone answering device of claim 1, further comprising:

switching means for switchably controlling a response of said single telephone answering device, said switching means being coupled to said single outgoing message recording unit and to said incoming message recording means, and said switching means being user controlled for setting said single telephone answering device so that when a telephone call is received, said single telephone answering device does not respond to said call, or only plays back an outgoing message, or only records an incoming message, in response to at least one identified ring type.

6. A process for deciding if a single telephone answering device is to answer an incoming telephone call on a single telephone line, comprising the steps of:

counting a total number of received ring cycles on said single telephone line, as they are received on said single telephone line, said step of counting including determining the end of each ring cycle by the steps of:

detecting ring signals in each said ring cycle, and determining the absence of a ring signal of each ring cycle for a predetermined time period;

comparing said counted total number of ring cycles with a predetermined value;

measuring a length of a previous ring cycle;

measuring a length of a last-received ring cycle, said last-received ring cycle occurring immediately after said previous ring cycle;

comparing the measured length of said last-received ring cycle with the measured length of said previous ring cycle; and answering said incoming telephone call only if said counted total number of ring cycles, including said last-received ring cycle, is equal to said predetermined value, and if said measured last-received ring cycle length is at least equal to said measured previous ring cycle length.

7. The process of claim 6, wherein:

said incoming telephone call is not answered when the measured last-received ring cycle length is shorter than said measured previous ring cycle length; and further comprising answering said incoming telephone call when said counted total number of ring cycles exceeds said predetermined value, regardless of the measured length of said last-received ring cycle.

8. A process for deciding if a single telephone answering device is to answer an incoming telephone call on a single telephone line, comprising the steps of:

counting a total number of received ring cycles on said single telephone line, as they are received on said single telephone line, said step of counting including determining the end of each ring cycle by the steps of:

detecting ring signals in each said ring cycle, and determining the absence of a ring signal of each ring cycle for a predetermined time period;

comparing said counted total number of ring cycles with a predetermined value;

measuring a length of a previous ring cycle;

measuring a length of a last-received ring cycle, said last-received ring cycle occurring immediately after said previous ring cycle;

comparing the measured length of said last-received ring cycle with the measured length of said previous ring cycle;

answering said incoming telephone call if said counted total number of ring cycles, including said last-received ring cycle, is equal to said predetermined value, and if said measured last-received ring cycle length is at least equal to said measured previous ring cycle length; and not answering said incoming telephone call when said counted total number of ring cycles is equal to said predetermined value, and said measured last-received ring cycle length is less than said measured previous ring cycle length.

9. The process of claim 8, comprising answering said incoming telephone call on a next ring cycle after a last-received ring cycle having a measured length which is not at least equal to a measured length of the previous ring cycle, if said counted total number of ring cycles including said next ring cycle is greater than said predetermined value.

* * * * *

UNITED STATES PATENT AND TRADEMARK OFFICE
CERTIFICATE OF CORRECTION

PATENT NO. : 5,577,104
DATED : November 19, 1996
INVENTOR(S) : KNUTH et al.

It is certified that error appears in the above-indentified patent and that said Letters Patent is hereby corrected as shown below:

Column 11, line 47 (claim 5, line 6),

"unit" should be --means--;

same line, after "said", insert --single--

Column 11, line 48 (claim 5, line 7),

"means" should be --unit--.

Column 11, line 46, (claim 5, line 5)
"Single" should be deleted

Signed and Sealed this

First Day of July, 1997

*Attest:*

BRUCE LEHMAN

*Attesting Officer*    Commissioner of Patents and Trademarks